(12) United States Patent
Chen

(10) Patent No.: US 12,556,751 B2
(45) Date of Patent: Feb. 17, 2026

(54) SYSTEMS AND METHODS FOR IMPROVING LIVE STREAMING

(71) Applicant: Adeia Guides Inc., San Jose, CA (US)

(72) Inventor: Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 560 days.

(21) Appl. No.: 17/898,925

(22) Filed: Aug. 30, 2022

(65) Prior Publication Data

US 2024/0073462 A1    Feb. 29, 2024

(51) Int. Cl.
| | |
|---|---|
| H04N 21/24 | (2011.01) |
| H04N 21/2187 | (2011.01) |
| H04N 21/231 | (2011.01) |
| H04N 21/234 | (2011.01) |

(52) U.S. Cl.
CPC ... *H04N 21/23424* (2013.01); *H04N 21/2187* (2013.01); *H04N 21/231* (2013.01); *H04N 21/2402* (2013.01)

(58) Field of Classification Search
None
See application file for complete search history.

(56) References Cited

U.S. PATENT DOCUMENTS

| | | | | |
|---|---|---|---|---|
| 9,473,758 | B1 * | 10/2016 | Long | H04N 13/275 |
| 10,778,354 | B1 * | 9/2020 | Hegar | H04N 21/23892 |
| 10,917,668 | B1 * | 2/2021 | Henaire | H04N 21/8456 |
| 11,044,297 | B2 * | 6/2021 | Lederer | H04N 21/8456 |
| 11,388,458 | B1 * | 7/2022 | Cohen | H04N 21/23805 |
| 11,553,224 | B1 * | 1/2023 | Zhou | H04N 21/2662 |
| 11,606,553 | B1 * | 3/2023 | Cohen | H04L 65/80 |
| 11,627,368 | B1 * | 4/2023 | Grover | H04L 65/612 |
| | | | | 725/93 |
| 11,689,601 | B1 * | 6/2023 | Fox | H04N 21/234354 |
| | | | | 709/231 |
| 2010/0167816 | A1 * | 7/2010 | Perlman | H04N 19/436 |
| | | | | 463/43 |
| 2016/0286244 | A1 * | 9/2016 | Chang | H04N 21/4788 |
| 2017/0085616 | A1 * | 3/2017 | Botsford | H04L 65/70 |
| 2020/0213635 | A1 * | 7/2020 | Baick | H04N 21/238 |
| 2020/0252312 | A1 * | 8/2020 | Harb | H04N 21/8456 |
| 2021/0136435 | A1 * | 5/2021 | Stobbart | H04N 21/44004 |
| 2022/0165306 | A1 * | 5/2022 | Hamada | H04N 21/8456 |
| 2022/0201345 | A1 * | 6/2022 | Link | H04N 21/812 |

(Continued)

OTHER PUBLICATIONS

"Cisco Annual Internet Report (2018-2023)", Technical Report by Cisco Systems, Inc.

(Continued)

*Primary Examiner* — Mushfikh I Alam
(74) *Attorney, Agent, or Firm* — HG LAW LLP

(57) ABSTRACT

Systems and methods are provided for improving live streaming. A content item comprising a plurality of segments is received at a computing device at a first time. The content item is stored, and it is identified that a first segment of the plurality of segments is below a quality threshold. The first segment is processed to improve the quality of the first segment, and the content item is updated with the improved-quality first segment. At a second time, a request to access the content item is received, and the updated version of the content item is transmitted in response to the request.

20 Claims, 10 Drawing Sheets

(56) References Cited

U.S. PATENT DOCUMENTS

2023/0088688 A1* 3/2023 Grois .................. H04L 65/70
　　　　　　　　　　　　　　　　　　　　　　709/231

OTHER PUBLICATIONS

Kim et al., "Neural-Enhanced Live Streaming: Improving Live Video Ingest via Online Learning," ACM SIGCOMM 19 pages (2020).
Lee et al., "Deep Neural Network-based Enhancement for Image and Video Streaming Systems: A Survey and Future Directions," ACM Comput. Surv. 54, 8, Article 169, 30 pages (2021).
Ray et al., "Vantage: Optimizing video upload for time-shifted viewing of social live streams," ACM SIGCOMM, 14 pages (2019).

* cited by examiner

SYSTEMS AND METHODS FOR IMPROVING LIVE STREAMING

BACKGROUND

The present disclosure is directed towards systems and methods for improving live streaming. In particular, systems and methods are provided herein for enabling relatively low-quality segments of a content item to be processed and replaced with relatively high-quality segments.

SUMMARY

The proliferation of smartphones and other computing devices that are able to capture videos via, for example, an integrated camera, as well as the general availability of network connections, such as those provided via cellular data services and/or Wi-Fi, has led to a rapid rise in the live streaming of videos. Typically, a live stream comprises capturing a video via a computing device, such as a smartphone, and broadcasting it in, substantially, real time to a plurality of other computing devices. However, cellular data services and/or Wi-Fi connections can be of variable bandwidth. The bandwidth may vary, for example, due to the number of other computing devices concurrently utilizing cellular data in the local area and/or the number of other computing devices that are connected to a Wi-Fi access point. Furthermore, as cellular data and Wi-Fi connections are wireless, a user who is live streaming may move about as they live stream and may, for example, walk from an area where there is a high signal to an area where there is a low signal. Typically, a live stream is broadcast from a server as a plurality of segments, and these received segments may vary in quality, up to a maximum quality, depending on a number of factors, such as the downlink bandwidth available to a receiving computing device. However, variations in the available uplink bandwidth (i.e., from the device that is live streaming) to another computing device, such as a server, can cause recipients of the live stream to receive low-quality segments, regardless of the downlink bandwidth that is available to them, as the maximum quality of the segments of the live stream that are available is dependent on the quality of the segments that have been uploaded from the streaming computing device.

To overcome these problems, systems and methods are provided herein for improving live streaming.

Systems and methods are described herein for improving live streaming. A content item comprising a plurality of segments is received at a computing device, at a first time. The content item is stored, and it is identified that a first segment of the plurality of segments is below a quality threshold. The first segment is processed to improve the quality of the first segment, and the content item is updated with the improved-quality first segment. At a second time, a request to access the content item is received, and at least a portion of the updated content item comprising the improved-quality first segment is transmitted in response to the request.

In an example system, a live stream is captured and transmitted from a smartphone, to a server, and a copy of the live stream is stored at the server. The live stream is typically transmitted to a plurality of users in, or substantially in, real time; however, users accessing the live stream in real time may experience substandard quality if the uplink bandwidth from the smartphone to the server is constrained. At the server, one or more segments of the content item that are of a relatively low quality due to, for example, uplink bandwidth constraints, are processed to improve the quality of the segments. In some examples, a trained neural network may be utilized to improve the quality of the segments. In other examples, higher-quality segments may be accessed and uploaded via, for example, a cache on the smartphone. The relatively low-quality segments are replaced with the improved- and/or higher-quality segments to generate an updated content item comprising the improved- and/or higher-quality segments. A request is received, for example, from a tablet device, to consume the content item at a later time (i.e., after the live stream has started and/or finished), and the updated content item is transmitted to the tablet device, thereby overcoming the issues related to substandard uplink bandwidth.

The first segment may be characterized and, based on the characterization of the first segment, a trained neural network may be identified. The first segment may be processed with the identified neural network. The quality threshold may be a first quality threshold, and processing the first segment to improve the quality of the first segment may comprise characterizing the first segment, identifying a neural network based on the characterization of the first segment, and identifying a subset of the plurality of segments of the content item that are above a second quality threshold. The identified neural network may be trained on the subset of segments of the content item that are above the second quality threshold, and the first segment may be processed with the trained neural network. The identified neural network may be trained on data received from a second computing device that is related to the first segment.

The content item may be a first content item, and the plurality of segments may be a first plurality of segments. At a third time, a second content item comprising a second plurality of segments may be received; the third time may be between the first time and the second time; the second plurality of segments may correspond to the first plurality of segments, and at least a subset of segments of the second plurality of segments may be of a higher quality than the corresponding segments of the first plurality of segments. Processing the first segment to improve the quality of the first segment may comprise identifying the corresponding segment in the second plurality of segments, identifying that the corresponding segment is of a higher quality than the first segment, and replacing the first segment with the higher-quality corresponding segment.

The computing device may be a first computing device, and a second computing device may be configured to transmit, via a network, the first and second content items to the first computing device. At the second computing device a capture may be captured and, based on network conditions, a first target bitrate may be identified. At the second computing device, a first content item may be generated from the capture, where the first plurality of segments are generated based on the first target bitrate. A second target bitrate may be identified based on a desired quality. A second content item may be generated from the capture at the second computing device, where the second plurality of segments are generated based on the second target bitrate. At least a subset of the second plurality of segments may be stored at the second computing device, and the first plurality of segments may be transmitted from the second computing device to the first computing device. Unutilized network capacity may be identified, and the second plurality of segments may be transmitted from the second computing device to the first computing device when there is unutilized network capacity. It may be identified at the second computing device that a quality of a segment of the first plurality of segments is below a third threshold. A corresponding higher-quality segment in the second plurality of segments may be identified, and the identified corresponding higher-quality segment may be prioritized for transmission from the second computing device to the first computing device.

The content item may be a first content item, and the plurality of segments may be a first plurality of segments. At a third time, a second content item comprising a second plurality of segments may be received. The third time may be between the first time and the second time, the second plurality of segments may correspond to the first plurality of segments, and at least a subset of segments of the second plurality of segments may be of a higher quality than the corresponding segments of the first plurality of segments. Processing the first segment to improve the quality of the first segment may comprise determining whether a difference between the quality of the first segment and the corresponding segment in the second plurality of segments is above or below a threshold value. If the difference in quality is below a threshold value, the first segment may be characterized, a trained neural network may be identified based on the characterization of the first segment, and the first segment may be processed with the identified neural network. If the difference in quality is above a threshold value, the corresponding segment in the second plurality of segments may be identified, it may be identified that the corresponding segment is of a higher quality than the first segment, and the first segment may be replaced with the higher-quality corresponding segment.

A manifest file may be generated based on the plurality of segments of the content item, and it may be identified that a difference in quality between the first segment and the improved-quality first segment is above a threshold value. The manifest file may be updated to refer to the improved-quality first segment. Improving the quality of the first segment may comprise improving the quality of audio and video components of the first segment.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Figure 1:
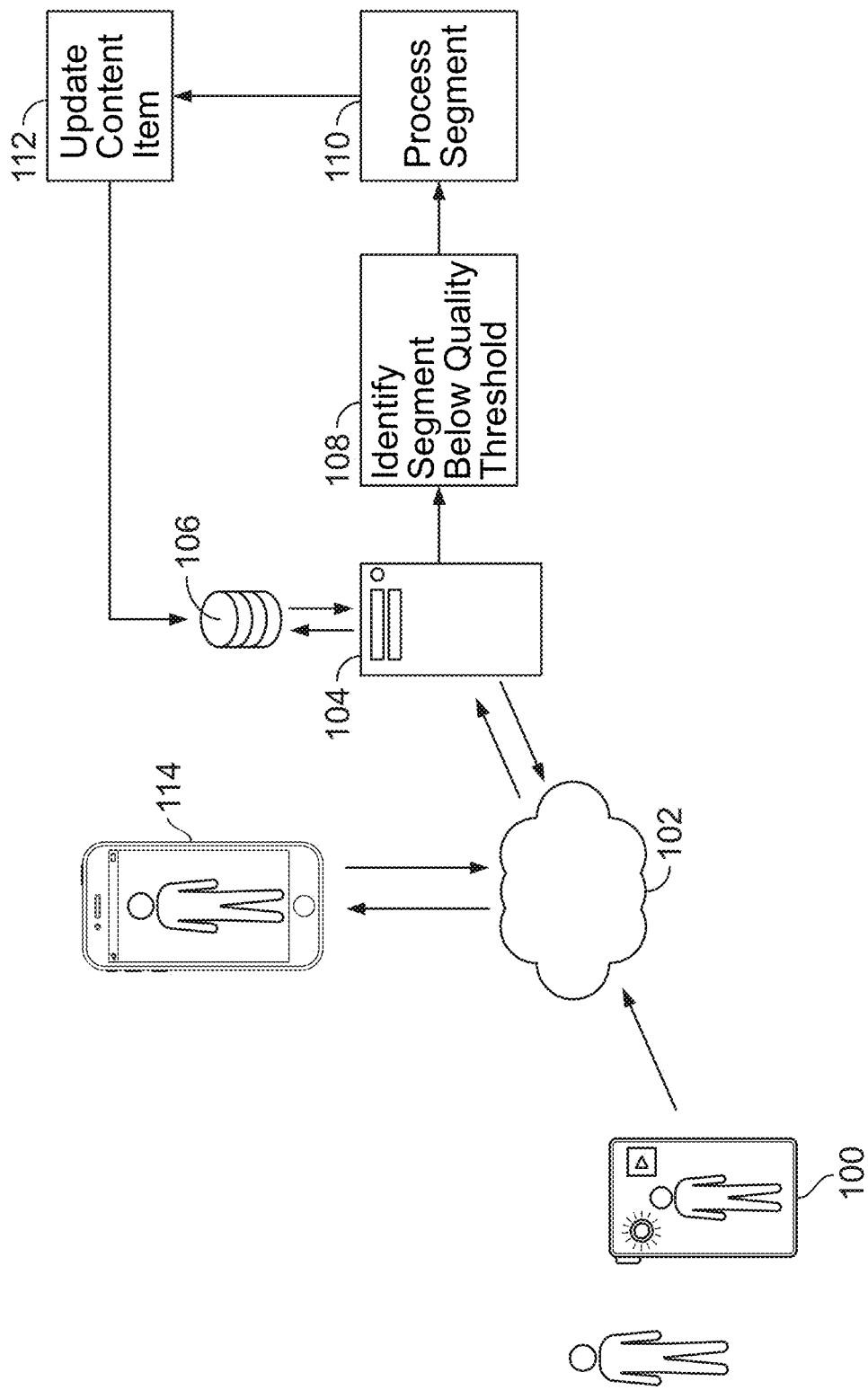
FIG. 1 shows an example environment in which live streaming is improved, in accordance with some embodiments of the disclosure.

Systems and methods are described herein for improving live streaming. A content item includes audio, video, text and/or any other media content. A content item may be a single media content item. In other examples, it may be a series (or season) of episodes of a media content item. Audio includes audio-only content, such as podcasts. Video includes audiovisual content such as movies and/or television programs. Text includes text-only content, such as event descriptions. One example of a suitable media content item is one that complies with the MPEG DASH standard. An OTT, streaming and/or VOD service (or platform) may be accessed via a website and/or an app running on a computing device, and the computing device may receive any type of content item, including live content items and/or on-demand content items. Content items may, for example, be streamed to physical computing devices. In another example, content items may be streamed to virtual computing devices in, for example, an augmented environment, a virtual environment and/or the metaverse.

Quality may refer to a resolution of a frame, or segment, of a content item. For example, a high-quality frame, or segment, may have a resolution of 1080p or 720p, and a low-quality frame, or segment, may have a resolution of 360p or 480p. In other examples, the quality may refer to the amount a frame, or segment, of the content item is compressed, for example, via a lossy video codec. For example, a highly compressed frame, or segment, may have a relatively low quality. Quality may also refer to the quality of an audio component of a content item. Any reference to improvement of quality herein may refer to improving video and/or audio quality of a content item.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1 shows an example environment in which live streaming is improved, in accordance with some embodiments of the disclosure. The environment comprises first smartphone 100, network 102, server 104, storage 106 and second smartphone 114. The first smartphone 100 and/or second smartphone 114 may alternatively be any suitable computing device including, for example, a tablet device and/or a Wi-Fi-enabled camera. The server 104 may also be any suitable computing device. A capture is captured via a camera of the first smartphone 100, and a content item is generated from the capture. The content item is transmitted via network 102, such as the internet, to the server 104. The network 102 may comprise wired and/or wireless means. The content item is stored at a storage 106 that is integral to, or is in communication with, the server 104. The storage may comprise a hard drive and/or a solid-state drive. An application running on the server identifies 108 one or more segments of the content item that are below a quality threshold. For example, it may be identified if one or more segments of the content item are below a threshold resolution. For example, the threshold resolution may be 720p and the segment may have a resolution of 360p which is below the threshold resolution. A segment that is identified to be below a threshold quality level is processed 110 to improve the quality. This may be via, for example, a trained neural network and/or substitution of corresponding segments that are of a higher quality, as discussed herein. The original content item is updated 112 to reflect the processed segment, or segments. In some examples, updating the content item may comprise transcoding the content item and updating an adaptive bitrate (ABR) ladder. In some examples, the segment of the original content item is updated and/or replaced; in other examples, a copy of the content item is created with the higher-quality segment rather than the corresponding segment of the original content item. In some examples, the higher-quality segment may be stored in a manner that associates it with the original content item, for example a manifest file may be updated to refer to the higher-quality segment; however, the original content item itself may not be updated.

The updated content item is stored at storage 106. In this example, the same storage is used for the originally received content item and the updated content item; however, in other examples, different physical storage may be used and, in some examples, either, or both, of the original and/or updated content item may be copied across multiple different physical storages. A second smartphone 114 requests access, via network 102, to the content item at a later time (i.e., after the live stream has started and/or finished), and the updated content item is transmitted, via network 102, to the second smartphone 114. In some examples, the request from the second smartphone 114 may be for a time-shifted start for a content item. As the updated content item comprises segments that are of a higher quality than the uploaded content item, the issues related to low-quality segments when uploading a content item via an uplink with substandard bandwidth are overcome. The server 104 may comprise a single physical or virtual server. In other examples, the processes associated with identifying 108 a segment below a quality threshold, processing 110 the segment and/or updating 112 the content item may take place on different physical or virtual servers. In some examples, any updated content item subsequently accessed may be transmitted from the same server 104 that is used to perform any of the aforementioned processes 108, 110, 112. In other examples, the content item may be transmitted from a different server to a server that is used to perform any of the aforementioned processes 108, 110, 112. In some examples, only one, or a subset, of the processes 108, 110, 112 may take place at the server 104, and the other process(es) may take place at the first smartphone 100.

Figure 2:
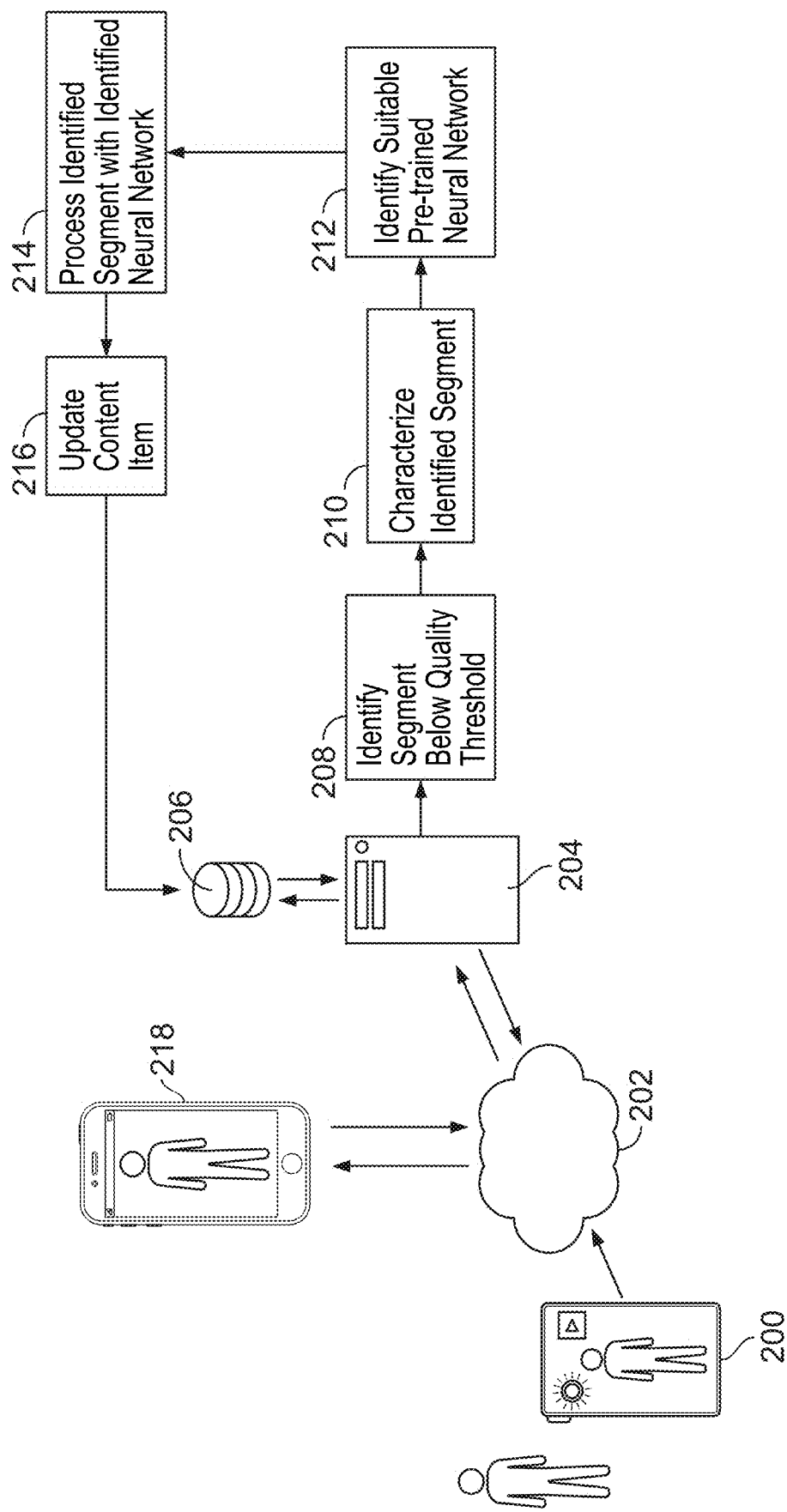
FIG. 2 shows another example environment in which live streaming is improved, in accordance with some embodiments of the disclosure.

FIG. 2 shows another example environment in which live streaming is improved, in accordance with some embodiments of the disclosure. In a similar manner to the environment discussed in connection with FIG. 1, the environment comprises first smartphone 200, network 202, server 204, storage 206 and second smartphone 218. Again, the smartphones 200, 218 and/or the server 204 may be any suitable computing devices. A capture is captured via a camera of the first smartphone 200, and a content item is generated from the capture. The content item is transmitted via network 202, such as the internet, to the server 204. The content item is stored at a storage 206 that is integral to, or is in communication with, the server 204. An application running on the server identifies 208 one or more segments of the content item that are below a quality threshold. For a segment that is identified to be below a threshold quality level, the identified segment is characterized 210, and a pretrained neural network that is suitable for processing the segment to improve the quality of the segment is identified 212. Identifying a suitable neural network may comprise identifying the neural network that will give the largest increase in quality and/or resolution of the frame, or frames, of the segment. In some examples, different neural networks may be selected for different segments of the same content item. The pre-trained neural networks may represent general purpose filters for video quality enhancement, for example, spatial upsampling to improve the resolution of the segment. The generalization of a neural network is a low-cost solution that can be advantageous over commonly used Bicubic and Lanczos filters in video upscaling.

The identified segment is processed 214 with the identified neural network, to produce a segment of improved quality. In some examples, the server 206 may comprise dedicated hardware for processing the segment, for example a dedicated neural network accelerator board. The original content item is updated 216 to reflect the processed segment, or segments. In some examples, updating the content item may comprise transcoding the content item and updating an ABR ladder, or a subset of the ladder. In some examples, the segment of the original content item is updated and/or replaced; in other examples, a copy of the content item is created with the higher-quality segment rather than the corresponding segment of the original content item. In some examples, the higher-quality segment may be stored in a manner that associates it with the original content item, for example a manifest file may be updated to refer to the higher-quality segment; however, the original content item itself may not be updated.

The updated content item is stored at storage 206. A second smartphone 218 requests access, via network 202, to the content item at a later time (i.e., after the live stream has started and/or finished), and the updated content item is transmitted, via network 202, to the second smartphone 218. As the updated content item comprises segments that are of a higher quality than the uploaded content item, the issues related to low-quality segments when uploading a content item via an uplink with substandard bandwidth are overcome. In addition, utilizing a neural network to improve the quality of segments in this manner does not increase the processing and/or network load on the first computing device 200. The server 204 may comprise a single physical or virtual server. In other examples, the processes associated with identifying 208 a segment below a quality threshold, characterizing 210 an identified segment, identifying 212 a suitable pre-trained neural network, processing 214 the identified segment with the identified neural network and/or updating 216 the content item may take place on different physical or virtual servers. In some examples, any updated content item subsequently accessed may be transmitted from the same server 204 that is used to perform any of the aforementioned processes 210, 212, 214, 216. In other examples, the content item may be transmitted from a different server to a server that is used to perform any of the aforementioned processes 210, 212, 214, 216. In some examples, only one, or a subset, of the processes 210, 212, 214, 216 may take place at the server 204, and the other process(es) may take place at the first smartphone 200. In some examples, the first smartphone 200 and/or server 204 may comprise a Google Tensor and/or Samsung Exynos processor that is used in performing the neural network processing.

Figure 3:
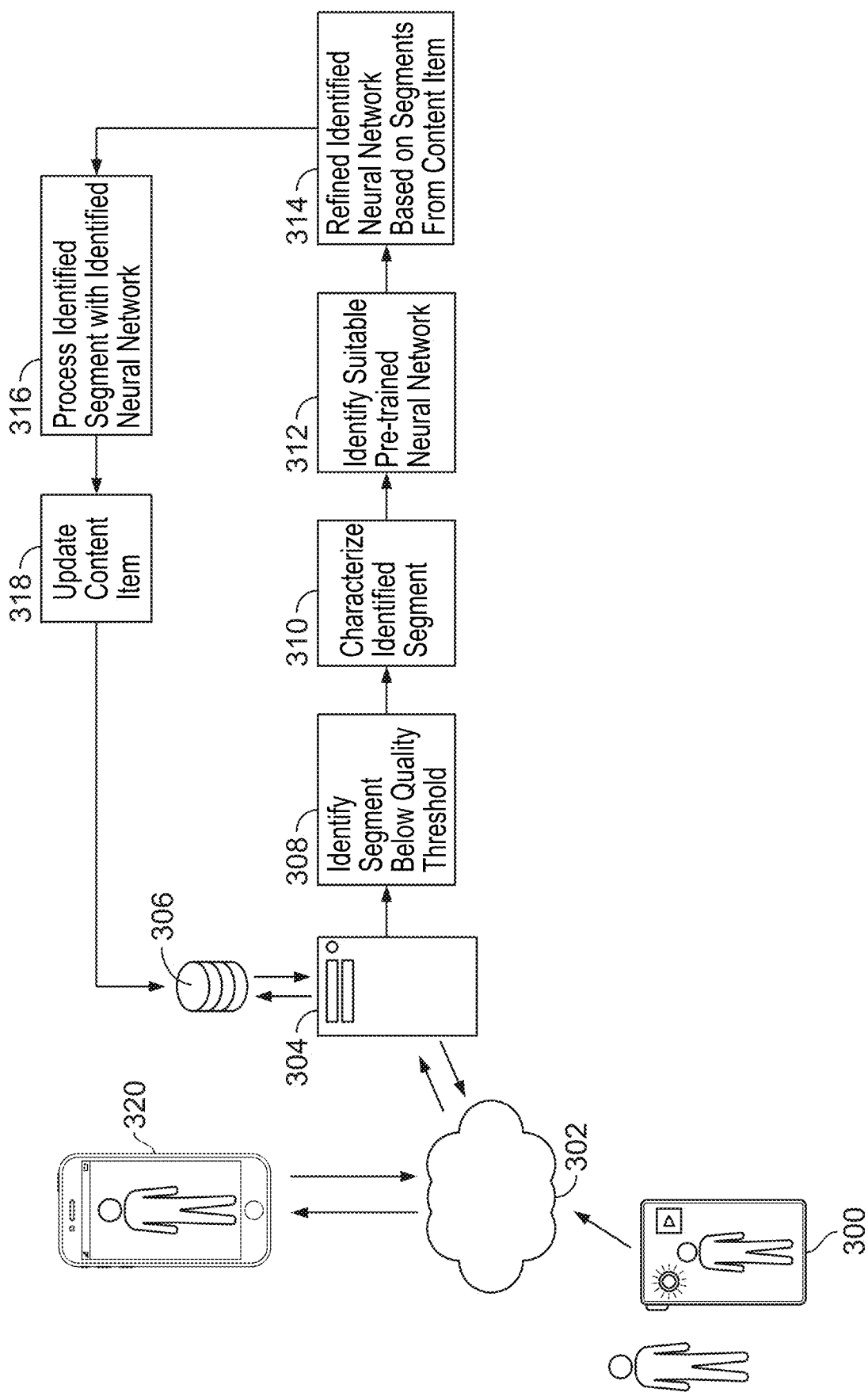
FIG. 3 shows another example environment in which live streaming is improved, in accordance with some embodiments of the disclosure.

FIG. 3 shows another example environment in which live streaming is improved, in accordance with some embodiments of the disclosure. In a similar manner to the environment discussed in connection with FIGS. 1 and 2, the environment comprises first smartphone 300, network 302, server 304, storage 306 and second smartphone 320. Again, the smartphones 300, 320 and/or the server 304 may be any suitable computing devices. A capture is captured via a camera of the first smartphone 300, and a content item is generated from the capture. The content item is transmitted via network 302, such as the internet, to the server 304. The content item is stored at a storage 306 that is integral to, or is in communication with, the server 304. An application running on the server identifies 308 one or more segments of the content item that are below a quality threshold. For a segment that is identified to be below a threshold quality level, the identified segment is characterized 310, and a pretrained neural network that is suitable for processing the segment to improve the quality of the segment is identified 312. Identifying a suitable neural network may comprise identifying the neural network that will give the largest increase in quality and/or resolution of the frame, or frames, of the segment. In some examples, different neural networks may be selected for different segments of the same content item. The pre-trained neural networks may represent general purpose filters for video quality enhancement, for example, spatial upsampling to improve the resolution of the segment. The generalization of a neural network is a low-cost solution that can be advantageous over commonly used Bicubic and Lanczos filters in video upscaling.

The identified neural network is refined 314 based on segments from the content item. Refining a neural network may comprise refining the weights of an identified neural network. A neural network may be refined to give the largest increase in quality and/or resolution of the frame, or frames, of the segment. In some examples, a neural network may utilize meta-learning (i.e., learning from the output of other neural networks) in an initial general stage, and finetune the neural network with, for example, relatively high-quality segments of the content item. In another example, the identified neural network may be refined based on segments from an initial configuration of a live streaming session, or segments transmitted prior to the start of the session. In some neural network refinement approaches, refinement may be based on a high-resolution segment of a content item and a down-sampled version of the same segment as an input to the re-training. However, an alternative to this method is to use encoded and decoded pictures, or frames, of a segment in two resolutions that are available via an ABR ladder of transcoding. This enables the neural network to process the effect, or degradation, from video compression because the input to neural network inferencing is a low-resolution picture, or frame, encoded at a low bitrate. In some examples, the results of refined neural networks can be stored and shared between the server 304 and the smartphone 300. The server 304 and the smartphone 300 may both have access to the dataset at every stage of the progressive, continued optimization.

The identified segment is processed 316 with the identified neural network to produce a segment of improved quality. In some examples, the server 304 may comprise dedicated hardware for processing the segment, for example a dedicated neural network accelerator board. The original content item is updated 318 to reflect the processed segment, or segments. In some examples, updating the content item may comprise transcoding the content item and updating an ABR ladder, or a subset of the ladder. In some examples, the segment of the original content item is updated and/or replaced; in other examples, a copy of the content item is created with the higher-quality segment rather than the corresponding segment of the original content item. In some examples, the higher-quality segment may be stored in a manner that associates it with the original content item, for example a manifest file may be updated to refer to the higher-quality segment; however, the original content item itself may not be updated.

The updated content item is stored at storage 306. A second smartphone 320 requests access, via network 302, to the content item at a later time (i.e., after the live stream has started and/or finished), and the updated content item is transmitted, via network 302, to the second smartphone 320. As the updated content item comprises segments that are of a higher quality than the uploaded content item, the issues related to low-quality segments when uploading a content item via an uplink with substandard bandwidth are overcome. In addition, utilizing a neural network to improve the quality of segments in this manner does not increase the processing and/or network load on the first computing device 300. The server 304 may comprise a single physical or virtual server. In other examples, the processes associated with identifying 308 a segment below a quality threshold, characterizing 310 an identified segment, identifying 312 a suitable pre-trained neural network, refining 314 the pre-trained neural network, processing 316 the identified segment with the identified neural network and/or updating 318 the content item may take place on different physical or virtual servers. In some examples, any updated content item subsequently accessed may be transmitted from the same server 304 that is used to perform any of the aforementioned processes 310, 312, 314, 316, 318. In other examples, the content item may be transmitted from a different server to a server that is used to perform any of the aforementioned processes 310, 312, 314, 316, 318. In some examples, only one, or a subset, of the processes 310, 312, 314, 316, 318 may take place at the server 304, and the other process(es)

may take place at the first smartphone 300. In some examples, the first smartphone 300 and/or server 304 may comprise a Google Tensor and/or Samsung Exynos processor that is used in performing the neural network processing.

Figure 4:
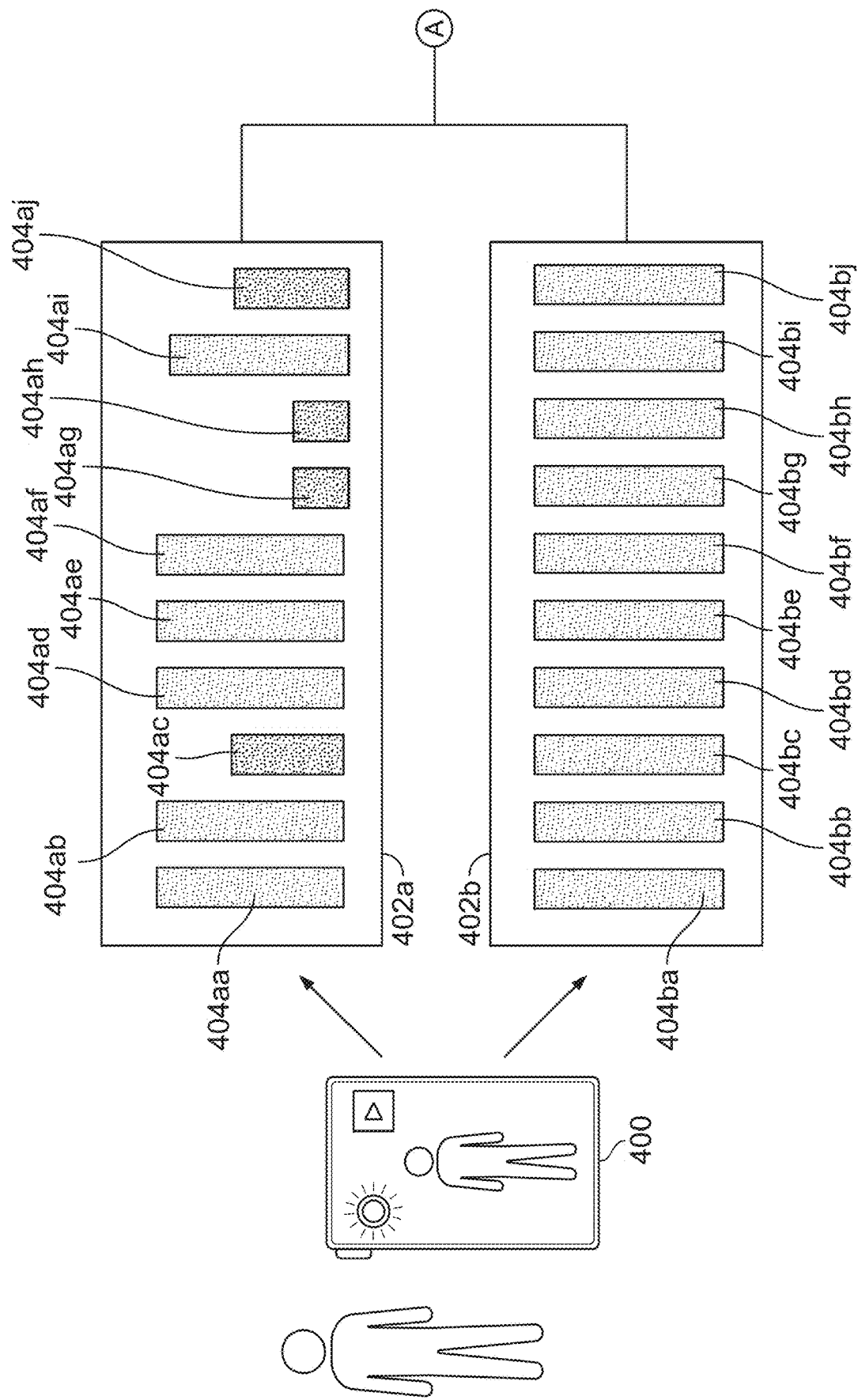
FIG. 4 shows another example environment in which live streaming is improved, in accordance with some embodiments of the disclosure.
Figure 4:
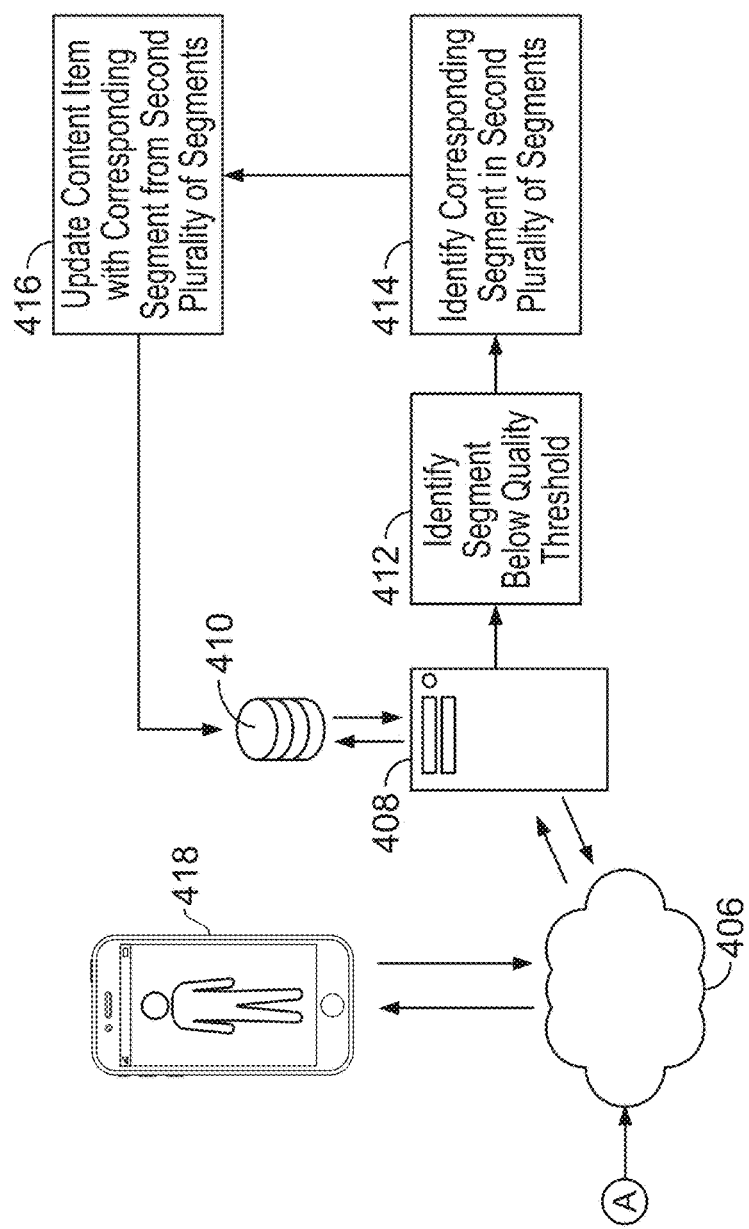

FIG. 4 shows another example environment in which live streaming is improved, in accordance with some embodiments of the disclosure. The environment comprises first smartphone 400, network 406, server 408, storage 410 and second smartphone 418. Again, the smartphones 400, 418 and/or the server 408 may be any suitable computing devices. A capture is captured via a camera of the first smartphone 400, and a first content item 402a and a second content item 402b are generated from the capture (i.e., the first and second content items 402a, 402b are generated from the same capture, and the segments of the first and second content items 402a, 402b correspond to each other, with corresponding segments of the same quality being identical to each other) and may, for example, include the same timing data (e.g., picture timing supplemental enhancement information (SEI)). The first content item 402a comprises a first plurality of segments 404aa, 404ab, 404ac, 404ad, 404ae, 404af, 404ag, 404ah, 404ai, 404aj, and the second content item 402b comprises a second plurality of segments 404ba, 404bb, 404bc, 404bd, 404be, 404bf, 404bg, 404bh, 404bi, 404bj that correspond to the first plurality of segments. The first plurality of segments comprises segments of different qualities. For example, segments 404ac, 404ag, 404ah, 404aj are of a lower quality than segments 404aa, 404ab, 404ad, 404ae, 404af, 404ah. The differing qualities of segments may arise, for example, due to a varying uplink bandwidth, and the quality of a segment may be reduced in order to ensure that the live stream continues to be available substantially in real time.

The second plurality of segments comprise segments of the same, or substantially similar, high quality. In this example, the qualities of segments 404aa, 404ab, 404ad, 404ae, 404ah of the first plurality of segments and segments 404ba, 404bb, 404bd, 404be, 404bh are the same. These second plurality of segments are stored in a buffer at the first computing device 400. In some examples, only the segments of the second plurality of segments (e.g., 404bc, 404bg, 404bh, 404bj) that correspond to low-quality segments in the first plurality of segments may be stored in the buffer and subsequently transmitted to the server 408. In some examples, the segments of the second plurality of segments (e.g., 404ba, 404bb, 404bd, 404be, 404bf, 404bh) that correspond to high quality segments in the first plurality of segments may be encoded as bitstreams that are of a minimum size but are independently decodable. Such minimum size bitstream segments can be pre-encoded (e.g., from black video frames), and duplicated and inserted whenever needed in the second plurality of segments. This enables the frames and blocks in the frames to be encoded at a minimum data rate to ensure a minimum payload for transmission with the other segments, while maintaining compliance of the bitstream of the second plurality of segments with any relevant video codec standard.

The first plurality of segments are transmitted, via network 406, to server 408 substantially in real time and at a higher priority than the second plurality of segments. The second plurality of segments (or subset of the second plurality of segments) are stored in the buffer at the first computing device 400 and are transmitted, via network 406, to server 408 in a best-effort manner, depending on available network bandwidth. In some examples, transmission of the second plurality of segments may occur a substantial amount of time after transmission of the first plurality of segments.

The segments of the first content item 402a and the corresponding second content item 402b are stored at a storage 410 that is integral to, or is in communication with, the server 408. An application running on the server 408 identifies 412 one or more segments of the first content item 402a that are below a quality threshold. For a segment that is identified to be below a threshold quality level, a corresponding segment in the second plurality of segments is identified 414. The first content item 402a is updated 416 with the corresponding segment from the second plurality of segments. In some examples, updating the content item may comprise transcoding the content item and updating an ABR ladder, or a subset of the ladder. In some examples, the segment of the original content item is updated and/or replaced; in other examples, a copy of the content item is created with the higher-quality segment rather than the corresponding segment of the original content item. In some examples, the higher-quality segment may be stored in a manner that associates it with the original content item, for example a manifest file may be updated to refer to the higher-quality segment; however, the original content item itself may not be updated.

The updated content item is stored at storage 410. A second smartphone 418 requests access, via network 406, to the content item at a later time (i.e., after the live stream has started and/or finished), and the updated content item is transmitted, via network 406, to the second smartphone 418. As the updated content item comprises segments that are of a higher quality than the uploaded content item, the issues related to low-quality segments when uploading a content item via an uplink with substandard bandwidth are overcome. The server 408 may comprise a single physical or virtual server. In other examples, the processes associated with identifying 412 a segment below a quality threshold, identifying 414 a corresponding segment in the second plurality of segments and/or updating 416 the content item may take place on different physical or virtual servers. In some examples, any updated content item subsequently accessed may be transmitted from the same server 408 that is used to perform any of the aforementioned processes 412, 414, 416. In other examples, the content item may be transmitted from a different server to a server that is used to perform any of the aforementioned processes 412, 414, 416. In some examples, only one, or a subset, of the processes 412, 414, 416 may take place at the server 408, and the other process may take place at the first smartphone 400.

Figure 5:
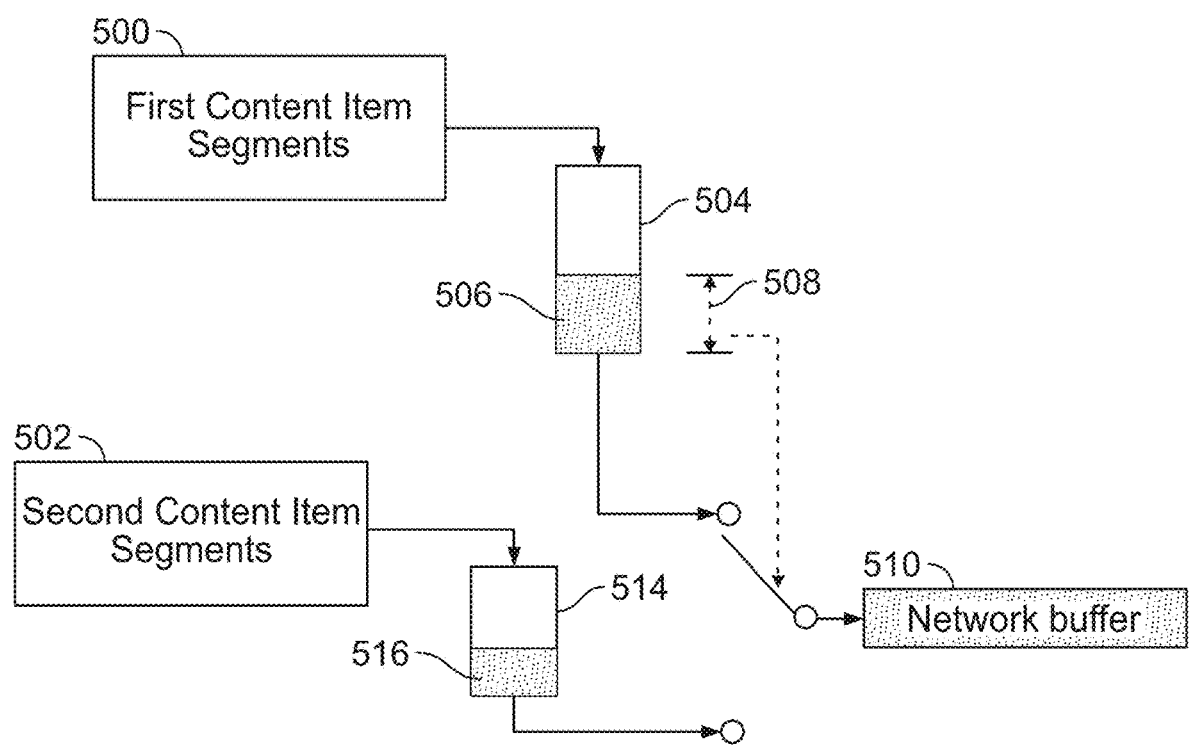
FIG. 5 shows an example environment for dual-buffer management, in accordance with some embodiments of the disclosure.

FIG. 5 shows an example environment for dual-buffer management, in accordance with some embodiments of the disclosure. The environment comprises segments of a first content item 500, a first buffer 504, segments of a second content item 502, a second buffer 514 and a network buffer 510. The first and second content items 500, 502 correspond, such that the content of the content items 500, 502 is the same (e.g., they relate to the same capture), but the quality of segments of the content items 500, 502 varies. Typically, the first content item 500 may be a live stream, where latency of delivery is important, so quality may be sacrificed to ensure that the stream can be transmitted substantially in real time. The second content item 502 is of a higher quality, but latency of delivery is not important. The buffers 504, 514 described may be used with the computing devices described in connection with FIGS. 4 and 6. Segments of a first content item 500, which are of varying quality (e.g., dependent on network conditions), enter the first buffer 504, which causes the first buffer 504 to fill 506. Segments of a second content item 502, all of which are of a high quality, enter the second buffer 514, which causes the second buffer

514 to fill 516. The extent 508 to which the first buffer 504 is filled 506 determines whether segments are transmitted via network buffer 510 from the first buffer 504 or the second buffer 514. Typically, if there are any segments in the first buffer 504, these segments are prioritized over segments in the second buffer 514, so that, for example, a live stream can be consumed substantially in real time. In some examples (not shown), the second buffer 514 is substantially larger than the first buffer 504, to enable the segments of the second content item to be stored. The segments stored in the second buffer 514 are transmitted (also not shown) via network buffer 510 when there is spare network capacity.

In some examples, different priorities may be given to improving the quality of different segments of the first content item depending on the quality of those segments. For example, segments of a relatively low quality, e.g., segments with a resolution of 360p, can be targeted for higher-priority improvement than segments of a relatively high quality, e.g., 720p. Segments of the second content item can be further split and muxed into multiple tiers of bitstreams, each consisting of the high-quality segments of those that were initially delivered in lower qualities as part of the first content item. This is to recognize the effect of diminishing gain from increasing the resolutions and bitrates. In other words, an improvement of increasing the resolution to 1080p of a segment that was originally transmitted in 360p is perceptually more significant than an improvement of increasing the resolution to 1080p of a segment that was originally transmitted in 720p. As such, the segments of the second content item (the second plurality of segments) may not be transmitted in chronological order. In some examples, a server may transmit a request to a streaming computing device for particular segments, based on the quality of the segments stored at the server.

When the server starts receiving the high-quality segments of the second content item, upgrading is not necessarily required for every resolution in an ABR ladder. For example, an ABR ladder may comprise resolutions of 360p, 480p, 540p, 720p, 1080p and 2160p. In this example, if a segment of the first content item was delivered in a resolution of 540p, only the encodes of 720p and higher resolutions would need to be improved and/or replaced as described herein. The improving may be applied across the boundaries (in the temporal domain) of segments in the ABR ladder. It is possible that the segment boundaries generated by transcoding that occurs at the server to enable ABR streaming may be different from those observed in the uploaded high-quality segments of the second content item.

Figure 6:
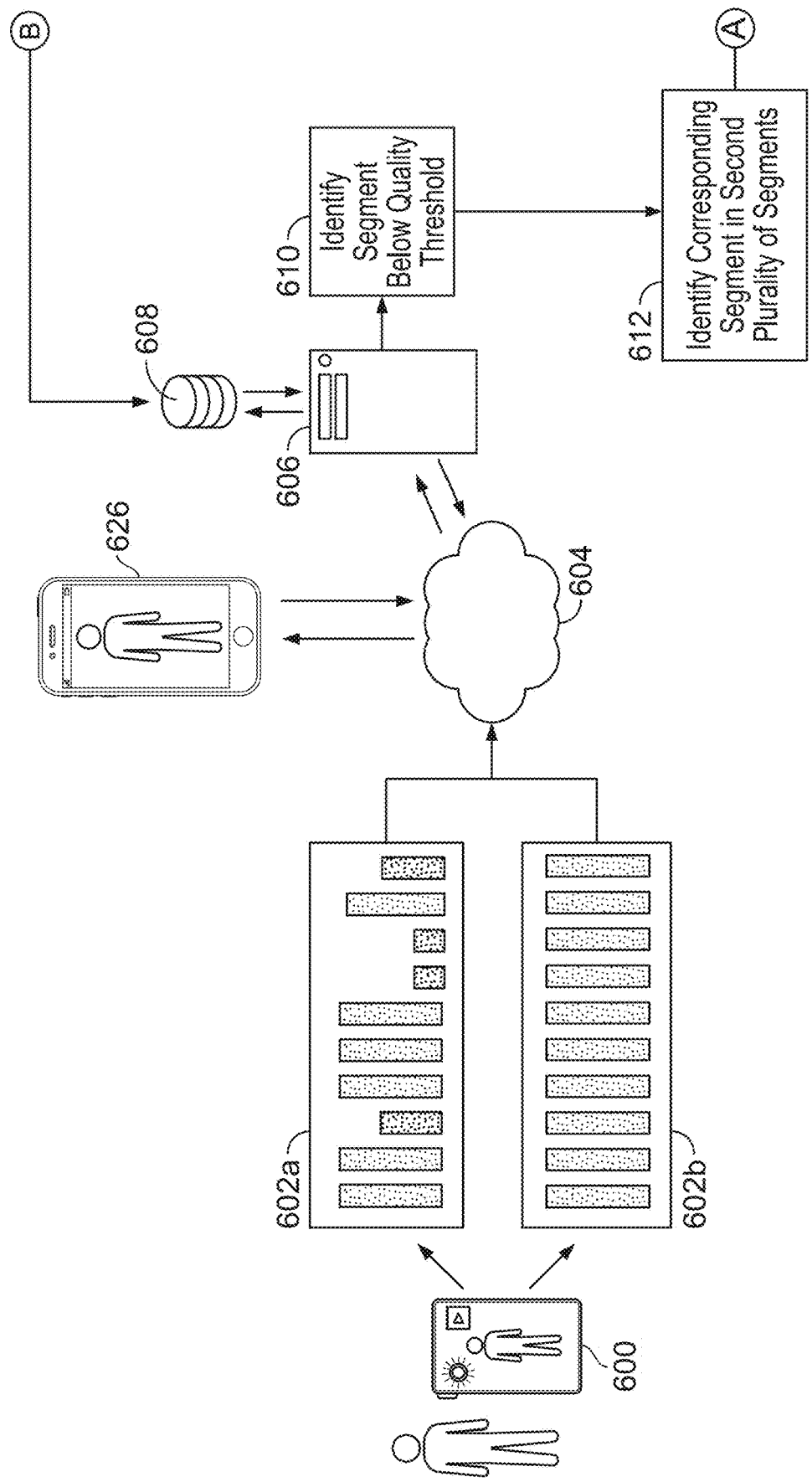
FIG. 6 shows another example environment in which live streaming is improved, in accordance with some embodiments of the disclosure.
Figure 6:
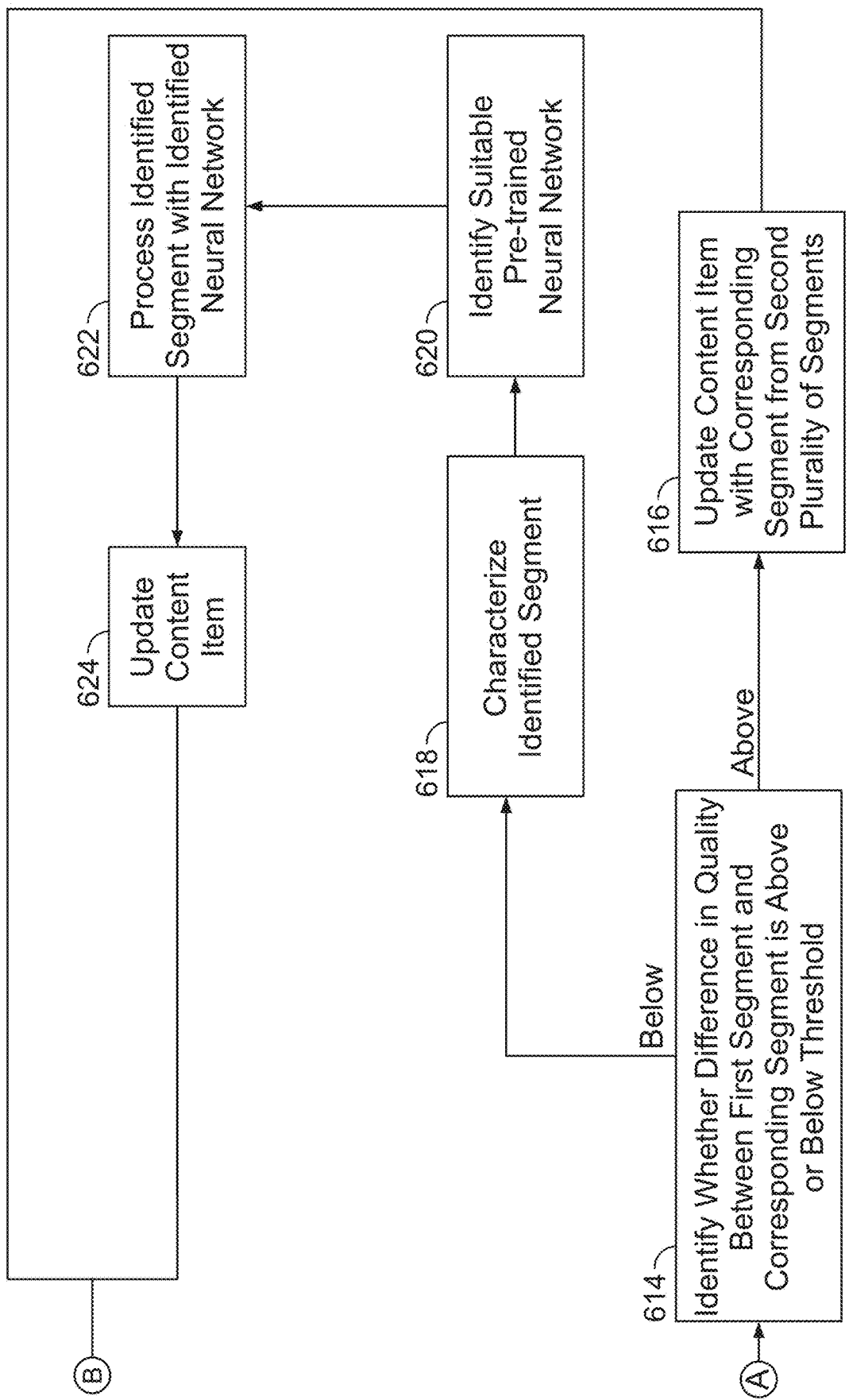

FIG. 6 shows another example environment in which live streaming is improved, in accordance with some embodiments of the disclosure. In a similar manner to the environments described in connection with FIGS. 1-4, the environment comprises first smartphone 600, network 604, server 606, storage 608 and second smartphone 626. Again, the smartphones 600, 626 and/or the server 606 may be any suitable computing device. A capture is captured via a camera of the first smartphone 600, and a first content item 602a and a second content item 602b are generated from the capture (i.e., the first and second content items 602a, 602b are generated from the same capture and the segments of the first and second content items 602a, 602b correspond to each other, with corresponding segments of the same quality being identical to each other). The first content item 602a comprises a first plurality of segments, and the second content item 602b comprises a second plurality of segments that correspond to the first plurality of segments. The first plurality of segments comprises segments of different qualities. The second plurality of segments comprise segments of the same, or substantially similar, high quality. These second plurality of segments are stored in a buffer at the first computing device 600. In some examples, only the segments of the second plurality of segments that correspond to a low-quality segment in the first plurality of segments may be stored in the buffer.

The first plurality of segments are transmitted, via network 604, to server 606 substantially in real time. The second plurality of segments (or subset of the second plurality of segments) are stored in the buffer at the first computing device 600 and are transmitted, via network 604, to server 606. The segments of the first content item 602a and the corresponding second content item 602b are stored at a storage 608 that is integral to, or is in communication with, the server 606. An application running on the server 606 identifies 612 one or more segments of the first content item 602a that are below a quality threshold. For a segment that is identified to be below a threshold quality level, a corresponding segment in the second plurality of segments is identified 612. For an identified segment, it is identified 614 whether a difference in quality between the first segment and the corresponding second segment is above or below a threshold value. For example, if the first segment is a 360p segment, and the corresponding segment is a 1080p segment, it may be determined that a difference in quality is above a threshold value. If, for example, the first segment is a 720p segment, and the corresponding segment is a 1080p segment, it may be determined that a difference in quality is below a threshold value. In some examples, trained neural networks may perform better at improving the quality of segments where a difference in values is below a threshold value (e.g., when improving quality from 720p to 1080p, rather than from 360p to 1080p). In some examples, the threshold difference value may be varied depending on the load at the server 606. For example, if the server has a high load associated with performing neural network improving of segments, then the threshold difference value may be varied such that more segments are replaced by corresponding higher-quality segments.

If the difference is above the threshold difference value, the first content item 602a is updated 616 with the corresponding segment from the second plurality of segments. For a segment that is identified to be below the threshold difference value, the identified segment is characterized 618, and a pretrained neural network that is suitable for processing the segment to improve the quality of the segment is identified 620. In some examples, the pre-trained neural network may be refined in the manner discussed above in connection with FIG. 3. The identified segment is processed 622 with the identified neural network, to produce a segment of improved quality. The original content item is updated 624 to reflect the processed segment, or segments. In some examples, updating the first content item 602a may comprise transcoding the content item and updating an ABR ladder. In some examples, the segment of the first content item 602a is updated and/or replaced; in other examples, a copy of the content item is created with the higher-quality segment rather than the corresponding segment of the original content item. In some examples, the higher-quality segment may be stored in a manner that associates it with the original content item, for example a manifest file may be updated to refer to the higher-quality segment; however, the original content item itself may not be updated.

The updated content item is stored at storage 608. A second smartphone 626 requests access, via network 604, to the content item at a later time (i.e., after the live stream has started and/or finished), and the updated content item is transmitted, via network 604, to the second smartphone 626. As the updated content item comprises segments that are of a higher quality than the uploaded content item, the issues related to low-quality segments when uploading a content item via an uplink with substandard bandwidth are overcome. The server 606 may comprise a single physical or virtual server. In other examples, the processes associated with identifying 610 a segment below a quality threshold, identifying 612 a corresponding segment, identifying 614 whether the difference in quality is above or below a threshold, updating 616 the content item with a corresponding segment, characterizing 618 an identified segment, identifying 620 a suitable pre-trained neural network, processing 622 the identified segment with the identified neural network and/or updating 624 the content item with the processed segment may take place on different physical or virtual servers. In some examples, any updated content item subsequently accessed may be transmitted from the same server 606 that is used to perform any of the aforementioned processes 610, 612, 614, 616, 618, 620, 622, 624. In other examples, the content item may be transmitted from a different server to a server that is used to perform any of the aforementioned processes 610, 612, 614, 616, 618, 620, 622, 624. In some examples, only one, or a subset, of the processes 610, 612, 614, 616, 618, 620, 622, 624 may take place at the server 606, and the other process may take place at the first smartphone 600. In some examples, the first smartphone 600 and/or server 606 may comprise a Google Tensor and/or Samsung Exynos processor that is used in performing the neural network processing.

In a variation on the environment described in connection with FIG. 6, an application running on the first smartphone 600 may make a determination whether to upload a segment of the second plurality of segments 602b to server 606. The determination may be based on identifying the difference in quality of a corresponding segment in the first plurality of segments 602a and the second plurality of segments. If, for example, the segment in the first plurality of segments is a 720p segment, and the corresponding segment in the second plurality of segments is a 1080p segment, it may be determined that a difference in quality is below a threshold value, and the corresponding segment from the second plurality of segments may not be uploaded to server 606. In this example, a neural network may be utilized at the server 606, as discussed herein, to improve the quality of the 720p segment. In another example, if the segment in the first plurality of segments is a 360p segment, and the corresponding segment in the second plurality of segments is a 1080p segment, it may be determined that the difference in quality is above a threshold value, and the corresponding segment from the second plurality of segments may be uploaded to server 606. In this example, the uploaded segment from the second plurality of segments may be used to replace the segment from the first plurality of segments at the server 606, as described herein. In some examples, the first smartphone 600 may receive instructions from the server 606 as to what the threshold difference in quality should be for triggering a segment from the second plurality of segments 606b to be uploaded.

Figure 7:
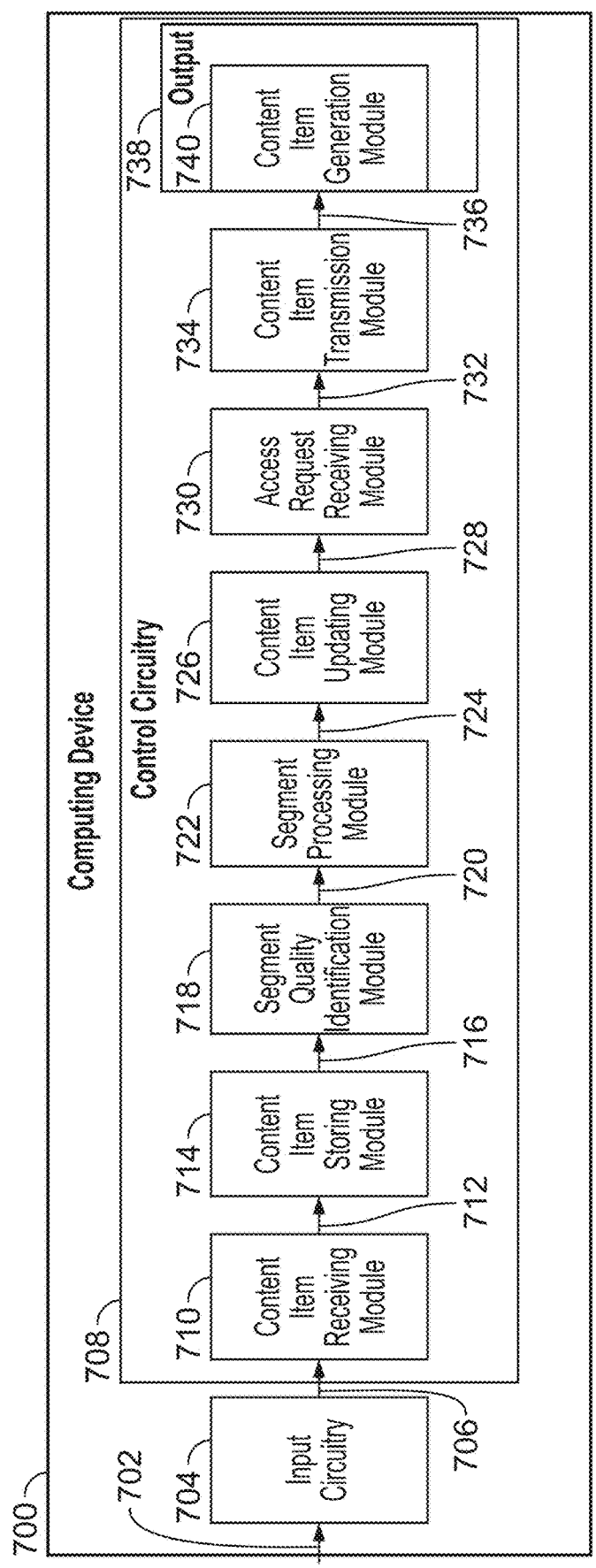
FIG. 7 shows a block diagram representing components of a computing device and dataflow therebetween for enabling improved live streaming, in accordance with some embodiments of the disclosure.

FIG. 7 shows a block diagram representing components of a computing device and dataflow therebetween for enabling improved live streaming, in accordance with some embodiments of the disclosure. Computing device 700 (e.g., smartphone 100, 200, 300, 400, 600), as discussed above, comprises input circuitry 704, control circuitry 708 and output circuitry 738. Control circuitry 708 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.1

Input is received 702 by the input circuitry 704. The input circuitry 702 is configured to received inputs related to a computing device. For example, this may be via an infrared controller, Bluetooth and/or Wi-Fi controller of the computing device 700, a touchscreen, a keyboard, a mouse and/or a microphone. In other examples, this may be via a gesture detected via an augmented, mixed and/or virtual reality device. In another example, the input may comprise instructions received via another computing device. The input circuitry 704 transmits 706 the user input to the control circuitry 708.

The control circuitry 708 comprises a content item receiving module 710, a content item storing module 714, a segment quality identification module 718, a segment processing module 722, a content item updating module 726, an access request receiving module 730, a content item transmission module 734 and an output circuitry 738 comprising a content item generation module 740. The input is transmitted 706 to the content item receiving module 710, where a content item is received, for example, from a smartphone that is live streaming. The content item is transmitted 712 to the content item storing module 714, where the content item is stored, for example, at a hard drive, and/or a solid-state drive of a server. In response to a request, at least a segment of the content item is transmitted 716 to the segment quality identification module 718, where it is identified whether a quality of the segment is below a threshold quality level. If the segment is below the threshold quality level, the segment is transmitted 720 to the segment processing module 722. If the segment is at, or above, the threshold quality level, another segment of the content item is transmitted 716, from the content item storing module 714, to the segment quality identification module 718, until all of, or at least a subset of, the segments of the content item have been processed. At the segment processing module 722, the segment is processed to improve the quality of the segment, for example, as described herein. The improved-quality segment is transmitted 724 to the content item updating module 726, where the content item is updated with the improved-quality segment. In some examples, the corresponding segment of the original content item is updated and/or replaced; in other examples, a copy of the content item is created with the improved-quality segment rather than the corresponding segment of the original content item. In some examples, the improved-quality segment may be stored in a manner that associates it with the original content item, for example a manifest file may be updated to refer to the improved-quality segment; however, the original content item itself may not be updated. An indication that an updated content item is available is transmitted 728 to the access request receiving module 730, where a request to access the content item is received, for example from a smartphone running a media application. On receiving a request to access the content item, relevant data from the request, for example an identifier of the requesting computing device, is transmitted 732 to the content item transmission module 734, where the updated content item is accessed for transmission. The content item is transmitted 736 to the output circuitry 738, where the content item is generated for output at the content item generation module 740.

Figure 8:
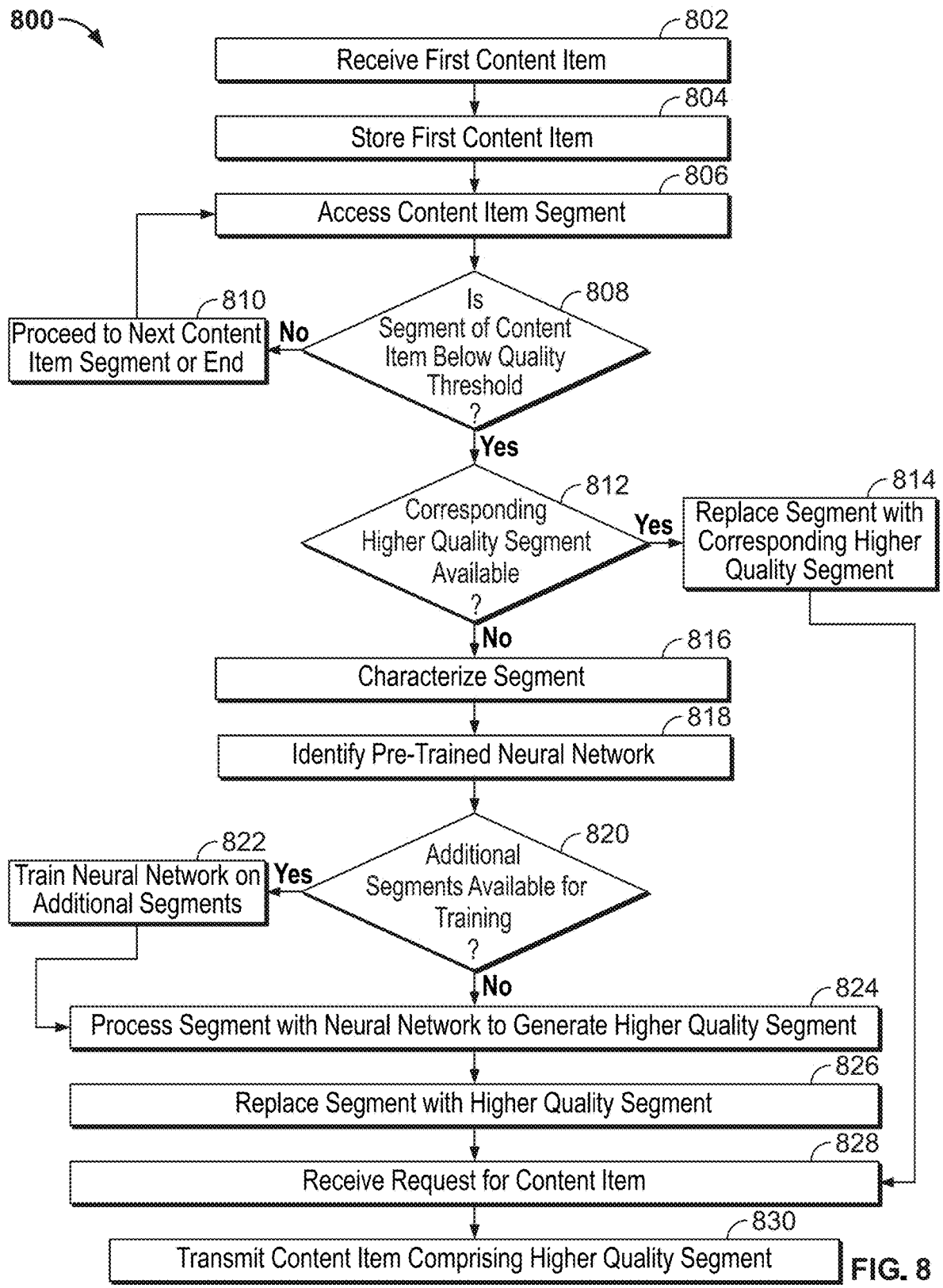
FIG. 8 shows a flowchart of illustrative steps involved in enabling improved live streaming, in accordance with some embodiments of the disclosure.

FIG. 8 shows a flowchart of illustrative steps involved in enabling improved live streaming, in accordance with some embodiments of the disclosure. Process 800 may be implemented on any of the aforementioned computing devices (e.g., smartphone 100, 200, 300, 400, 600). In addition, one or more actions of the process 800 may be incorporated into or combined with one or more actions of any other process or embodiments described herein.

At 802, a first content item is received, for example, from a tablet that is live streaming, and at 804, the first content item is stored, for example, at a hard drive or solid-state drive of a server. At 806, a segment of the content item is accessed, and at 808 it is identified whether a segment of the content item is below a quality threshold. If the segment is not below the quality threshold, then the process proceeds to 810, where the next segment of the content item is accessed and the process loops back to step 806; otherwise, the process ends, for example, if the last segment of the content item has been processed. If, at 808, the segment of the content item is below the quality threshold, then, at 812, it is identified whether a corresponding higher-quality segment is available. If a corresponding higher-quality segment is available, the relatively low-quality segment is replaced with the corresponding higher-quality segment at 814, and the process proceeds to step 828, as discussed below. If a corresponding higher-quality segment is not available, the segment is characterized at 816, and at 818 a pre-trained neural network is identified. At 820, it is identified whether any additional segments are available for training, for example, relatively high-quality segments of the content item and/or segments from an initial configuration of a live streaming session. If additional segments are available for training, at 822, the neural network is trained on the additional segments. At 824, the process proceeds from steps 820 or 822, and the segment is processed with the neural network to generate a higher-quality segment. At 826, the original segment is replaced with the higher-quality segment. In some examples, the segment of the original content item is updated and/or replaced; in other examples, a copy of the content item is created with the higher-quality segment rather than the corresponding segment of the original content item. In some examples, the higher-quality segment may be stored in a manner that associates it with the original content item, for example a manifest file may be updated to refer to the higher-quality segment; however, the original content item itself may not be updated. At 828, a request for the content item is received, for example from a tablet running a media application, and, at 830, the content item comprising the higher-quality segment is transmitted, for example, to the tablet running the media application.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method, the method comprising:
receiving, at a computing device and at a first time, a content item comprising a plurality of segments, wherein the content item comprises a live content item;
identifying that a first segment of the plurality of segments is below a first quality threshold;
characterizing the first segment;
selecting, from a plurality of neural networks and based at least in part on the characterization of the first segment, a neural network that will give a largest increase in quality of the first segment;
processing the first segment with the selected neural network to improve the quality of the first segment;
updating the content item with the improved-quality first segment;
receiving, at a second time, a request to access the content item; and
transmitting at least a first portion of the updated content item comprising the improved-quality first segment in response to the request;
identifying a second segment of the updated content item that is above a second quality threshold;
refining the selected neural network based on, at least in part, the second segment of the updated content item to produce a refined neural network, wherein the refining comprises updating one or more weights of the selected neural network;
processing a third segment of the content item with the refined neural network to improve the quality of the third segment;
updating the content item with the improved-quality third segment; and
transmitting, substantially in real time, at least a second portion of the updated content item comprising the improved-quality third segment.

2. The method of claim 1, wherein:
identifying the second segment comprises identifying a subset of the plurality of segments of the content item that are above the second quality threshold, wherein the subset comprises the second segment; and
refining the selected neural network comprises refining the selected neural network based on, at least in part, the identified subset of the plurality of segments.

3. The method of claim 2, further comprising refining the selected neural network on data, received from a second computing device, that is related to the first segment.

4. The method of claim 1, wherein:
the content item is a first content item and the plurality of segments are a first plurality of segments, the method further comprising:
receiving, at a third time, a second content item comprising a second plurality of segments, wherein:
the third time is between the first time and the second time;

the second plurality of segments correspond to the first plurality of segments; and
at least a subset of segments of the second plurality of segments are of a higher quality than the corresponding segments of the first plurality of segments; and
processing the first segment to improve the quality of the first segment further comprises:
identifying the corresponding segment in the second plurality of segments;
identifying that the corresponding segment is of a higher quality than the first segment; and
replacing the first segment with the higher-quality corresponding segment.

5. The method of claim 4, wherein the computing device is a first computing device, the method further comprising:
a second computing device for transmitting, via a network, the first and second content items to the first computing device;
capturing, at the second computing device, a capture;
identifying, based at least in part on network conditions, a first target bitrate;
generating, at the second computing device, a first content item from the capture, wherein the first plurality of segments is generated based at least in part on the first target bitrate;
identifying, based at least in part on a desired quality, a second target bitrate;
generating, at the second computing device, a second content item from the capture, wherein the second plurality of segments are generated based at least in part on the second target bitrate;
storing at least a subset of the second plurality of segments at the second computing device;
transmitting, from the second computing device to the first computing device, the first plurality of segments;
identifying unutilized network capacity; and
transmitting, from the second computing device to the first computing device, the second plurality of segments when there is unutilized network capacity.

6. The method of claim 5, further comprising:
identifying, at the second computing device, that a quality of a segment of the first plurality of segments is below a third threshold;
identifying a corresponding higher-quality segment in the second plurality of segments; and
prioritizing the identified corresponding higher-quality segment for transmission from the second computing device to the first computing device.

7. The method of claim 1, further comprising:
generating a manifest file based at least in part on the plurality of segments of the content item;
identifying that a difference in quality between the first segment and the improved-quality first segment is above a threshold value; and
updating the manifest file to refer to the improved-quality first segment.

8. The method of claim 1, wherein:
the content item is a first content item and the plurality of segments are a first plurality of segments, the method further comprising:
receiving, at a third time, a second content item comprising a second plurality of segments, wherein:
the third time is between the first time and the second time;
the second plurality of segments correspond to the first plurality of segments; and
at least a subset of segments of the second plurality of segments are of a higher quality than the corresponding segments of the first plurality of segments; and
processing the first segment to improve the quality of the first segment further comprises:
determining that a difference between the quality of the first segment and the corresponding segment in the second plurality of segments is above a threshold value;
identifying the corresponding segment in the second plurality of segments;
identifying that the corresponding segment is of a higher quality than the first segment; and
replacing the first segment with the higher-quality corresponding segment.

9. The method of claim 1, wherein improving the quality of the first segment comprises improving the quality of audio and video components of the first segment.

10. A system, the system comprising:
a communication port;
a memory storing instructions; and
control circuitry communicably coupled to the memory and the communication port and configured to execute instructions to:
receive, at a computing device and at a first time, a content item comprising a plurality of segments, wherein the content item comprises a live content item;
identify that a first segment of the plurality of segments is below a first quality threshold;
characterize the first segment;
select, from a plurality of neural networks and based at least in part on the characterization of the first segment, a neural network that will give a largest increase in quality of the first segment;
process the first segment with the selected neural network to improve the quality of the first segment;
update the content item with the improved-quality first segment;
receive, at a second time, a request to access the content item; and
transmit at least a first portion of the updated content item comprising the improved-quality first segment in response to the request;
identify a second segment of the updated content item that is above a second quality threshold;
refine the selected neural network based on, at least in part, the second segment of the updated content item to produce a refined neural network, wherein the refining comprises updating one or more weights of the selected neural network;
process a third segment of the content item with the refined neural network to improve the quality of the third segment;
update the content item with the improved-quality third segment; and
transmit, substantially in real time, at least a second portion of the updated content item comprising the improved-quality third segment.

11. The system of claim 10, wherein:
the control circuitry configured to identify the second segment is configured to identify a subset of the plurality of segments of the content item that are above the second quality threshold, wherein the subset comprises the second segment; and the control circuitry configured to refine the selected neural network is configured to refine the selected neural network based on, at least in part, the identified subset of the plurality of segments.

12. The system of claim 11, wherein the control circuitry configured to refine the selected neural network is further configured to refine the identified neural network on data, received from a second computing device, that is related to the first segment.

13. The system of claim 10, wherein:
the content item is a first content item, the plurality of segments are a first plurality of segments, and the control circuitry is further configured to:
receive, at a third time, a second content item comprising a second plurality of segments, wherein:
the third time is between the first time and the second time;
the second plurality of segments correspond to the first plurality of segments, and
at least a subset of segments of the second plurality of segments are of a higher quality than the corresponding segments of the first plurality of segments; and
the control circuitry configured to process the first segment to improve the quality of the first segment is further configured to:
identify the corresponding segment in the second plurality of segments;
identify that the corresponding segment is of a higher quality than the first segment; and
replace the first segment with the higher-quality corresponding segment.

14. The system of claim 13, wherein the computing device is a first computing device, the system further comprising:
a second computing device for transmitting, via a network, the first and second content items to the first computing device, and wherein the control circuitry is further configured to:
capture, at the second computing device, a capture;
identify, based at least in part on network conditions, a first target bitrate;
generate, at the second computing device, a first content item from the capture, wherein the first plurality of segments is generated based at least in part on the first target bitrate;
identify, based at least in part on a desired quality, a second target bitrate;
generate, at the second computing device, a second content item from the capture, wherein the second plurality of segments are generated based at least in part on the second target bitrate;
store at least a subset of the second plurality of segments at the second computing device;
transmit, from the second computing device to the first computing device, the first plurality of segments;
identify unutilized network capacity; and
transmit, from the second computing device to the first computing device, the second plurality of segments when there is unutilized network capacity.

15. The system of claim 14, wherein the control circuitry is further configured to:

identify, at the second computing device, that a quality of a segment of the first plurality of segments is below a third threshold;
identify a corresponding higher-quality segment in the second plurality of segments; and
prioritize the identified corresponding higher-quality segment for transmission from the second computing device to the first computing device.

16. The system of claim 10, wherein the control circuitry is further configured to:
generate a manifest file based at least in part on the plurality of segments of the content item;
identify that a difference in quality between the first segment and the improved-quality first segment is above a threshold value; and
update the manifest file to refer to the improved-quality first segment.

17. The system of claim 10, wherein the content item is a first content item and the plurality of segments are a first plurality of segments, the control circuitry further configured to:
receive, at a third time, a second content item comprising a second plurality of segments, wherein:
the third time is between the first time and the second time;
the second plurality of segments correspond to the first plurality of segments; and
at least a subset of segments of the second plurality of segments are of a higher quality than the corresponding segments of the first plurality of segments; and
the control circuitry configured to process the first segment to improve the quality of the first segment is further configured to:
determine that a difference between the quality of the first segment and the corresponding segment in the second plurality of segments is above a threshold value;
identify the corresponding segment in the second plurality of segments;
identify that the corresponding segment is of a higher quality than the first segment; and
replace the first segment with the higher-quality corresponding segment.

18. The system of claim 10, wherein the control circuitry configured to improve the quality of the first segment is further configured to improve the quality of audio and video components of the first segment.

19. The method of claim 1, wherein the refining the selected neural network comprises comparing different versions of the second segment of the content item, wherein the different versions have different bitrates and are accessible via a variable bitrate ladder.

20. The system of claim 10, wherein the control circuitry configured to refine the selected neural network is further configured to compare different versions of the second segment of the content item, wherein the different versions have different bitrates and are accessible via a variable bitrate ladder.

* * * * *